(12) United States Patent
Seibold et al.

(10) Patent No.: US 9,010,861 B2
(45) Date of Patent: Apr. 21, 2015

(54) SWIVEL INGRESS VEHICLE SEAT

(75) Inventors: Kurt A. Seibold, Whitmore Lake, MI (US); Ronald G. Bedro, Plymouth, MI (US); Miodrag Mitch Petrovich, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 122 days.

(21) Appl. No.: 13/704,069

(22) PCT Filed: Jun. 16, 2011

(86) PCT No.: PCT/US2011/040646
§ 371 (c)(1),
(2), (4) Date: Jan. 31, 2013

(87) PCT Pub. No.: WO2012/003096
PCT Pub. Date: Jan. 5, 2012

(65) Prior Publication Data
US 2013/0127221 A1    May 23, 2013

Related U.S. Application Data

(60) Provisional application No. 61/360,751, filed on Jul. 1, 2010.

(51) Int. Cl.
*A47C 1/00*    (2006.01)
*B60N 2/14*    (2006.01)
*B60N 2/06*    (2006.01)
*B60N 2/08*    (2006.01)
*B60N 2/24*    (2006.01)

(52) U.S. Cl.
CPC .. *B60N 2/14* (2013.01); *B60N 2/06* (2013.01); *B60N 2/08* (2013.01); *B60N 2/146* (2013.01); *B60N 2/245* (2013.01)

(58) Field of Classification Search
CPC ........ B60N 2/14; B60N 2/146; B60N 2/0745; B60N 2/0742; B60N 2002/0256
USPC ................ 297/344.1, 344.21, 344.24, 344.23
See application file for complete search history.

(56) References Cited

U.S. PATENT DOCUMENTS

| | | | | |
|---|---|---|---|---|
| 2,290,464 | A * | 7/1942 | Buchheit | 296/65.07 |
| 3,860,283 | A | 1/1975 | Colautti | |
| 5,651,576 | A * | 7/1997 | Wallace | 296/65.11 |
| 6,557,919 | B2 * | 5/2003 | Suga et al. | 296/65.07 |
| 6,572,172 | B1 | 6/2003 | Ninomiya et al. | |
| 7,334,829 | B2 * | 2/2008 | Fukui et al. | 296/65.11 |
| 8,220,856 | B2 * | 7/2012 | Horiguchi et al. | 296/65.18 |
| 2008/0023613 | A1 | 1/2008 | Brewer et al. | |
| 2009/0174346 | A1 | 7/2009 | Hwang et al. | |

* cited by examiner

*Primary Examiner* — Sarah B McPartlin
(74) *Attorney, Agent, or Firm* — Dickinson Wright PLLC

(57) ABSTRACT

The present invention is directed to a vehicle seat that pivots to allow easy ingress and egress and in particular to a vehicle seat that manually pivots in conjunction with linear movement to allow easy ingress and egress to seating located behind the pivoting seat.

17 Claims, 8 Drawing Sheets

SWIVEL INGRESS VEHICLE SEAT

CROSS-REFERENCE TO RELATED APPLICATIONS

This U.S. National Stage Patent Application claims the benefit of International Application serial number PCT/US11/40646 filed Jun. 16, 2011, entitled "Swivel Ingress Vehicle Seat" and U.S. Provisional Patent Application Ser. No. 61/360,751 filed Jul. 1, 2010, entitled "Swivel Ingress Vehicle Seat," the entire disclosures of the applications being considered part of the disclosure of this application, and hereby incorporated by reference.

BACKGROUND

The present invention is directed to a vehicle seat that pivots to allow easy ingress and egress and in particular to a vehicle seat that manually pivots in conjunction with linear motion to have a combined linear and rotational movement to allow easy ingress and egress to seating located behind the combined movement seat, including even while a child seat remains secured to the combined movement seat.

Manufacturers have long strived to add seating capacity to vehicles, however accessing vehicle seats that do not have their own door such as third row seating in SUVs, crossovers and mini vans or second row seating in two-door vehicles has always been problematic. As manufacturers decreased the size of vehicles or added additional seating to vehicles, problems of egress and ingress have become particularly acute. In addition, most adults currently find accessing vehicle seats which do not have their own dedicated door opening to be problematic and require exceptional flexibility and balance at times.

For some vehicles, such as those having higher entry points, including SUVs and some crossovers, as well as vehicles with smaller doors, or limited entering access space, some difficulty may be encountered with individuals with disabilities or elderly individuals with limited range of motion to enter and sit upon a particular seat even if it includes its own dedicated vehicle door and then pivoting the feet and legs into the vehicle. Given the limited range of motion of some adults, the normal methods of entry may be time consuming or constrained. Furthermore, as vehicles become more compact, some door openings, in particular for the rear doors of the vehicle at times have been minimized in size creating additional difficulties for adults, especially for those with limited range of motion to enter a vehicle.

While some manufacturers have attempted to improve access to vehicle seats positioned behind other vehicle seats and without their own access doors by allowing easy sliding forward of the seat or pivoting or flipping up of the seat, many times the rearward outer edge of the seat is still in the way of easy placement of the feet when entering the vehicle. These methods of entry also generally are precluded from being used when an occupant is already occupying a particular vehicle seat. Therefore, for a passenger to exit, for example a third row of seats without their own door, typically the second row passengers on at least one side must exit the vehicle then rearrange the vehicle seat to allow the third row vehicle passengers to exit. At times and in certain conditions such as in inclement weather, this full exiting of the vehicle and rearranging of the seat is time consuming and undesirable. Another challenge that may occur is when a child seat is placed in the seat making tipping of the seat infeasible and the exiting or entering of the vehicle a challenge.

Some owners of vehicles require child seats or booster seats secured to vehicle seats as required for the transportation of children. For vehicles having third row seats, it is very difficult to secure a child within one of these seats. Therefore, most owners secure the child seat or booster to the second row of seats, however, almost any time the third row of seats are used, the child or booster seat must be removed to allow the seat to fold and slide forward. Removal and resecuring the child or booster seat to the vehicle seat is difficult, and compounded if the owner has a child in their arms. Furthermore, once the person is in the third row, the process must be repeated to allow that person to egress.

SUMMARY

The present invention is directed to a vehicle seat that pivots to allow easy ingress and egress and in particular to a vehicle seat that manually pivots in conjunction with linear movement to allow easy ingress and egress to seating located behind the pivoting seat.

The present invention provides a seat that moves linearly and also pivots at the same time with the front of the seat facing outwardly while the rear outward corner moves forward and inward allowing an easy egress and ingress path to the seats located behind the moveable seat. The present invention displays a manual system, though replacing the latch with a structural power actuator would that when released, allows the seat to move linearly and simultaneously pivot allowing an occupant of the seat or a person outside the car to either drive the seat forward which in turn drives the rotation or physically rotate the seat which in turn drives the motion forward is possible. By combining the two motions, the seat will uniformly and smoothly slide forward while rotating out of the way allowing for easy ingress and egress.

DESCRIPTION

Figure 1:
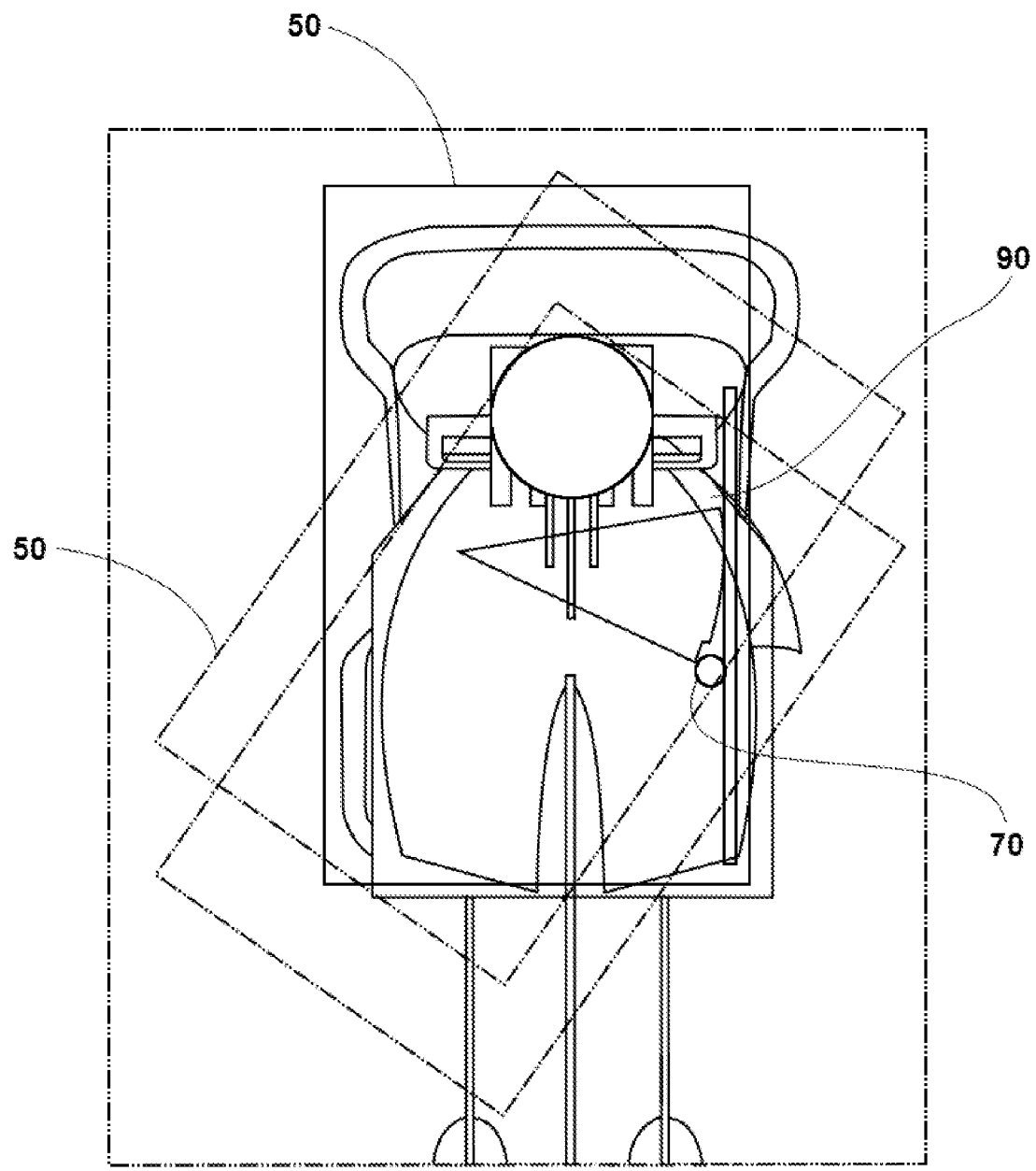
FIG. 1 is a top view of a vehicle seat showing positions of the seat and seat back, including an exemplary occupant within the seat, with block diagrams representing the original position plus two different swiveled positions.
Figure 2:
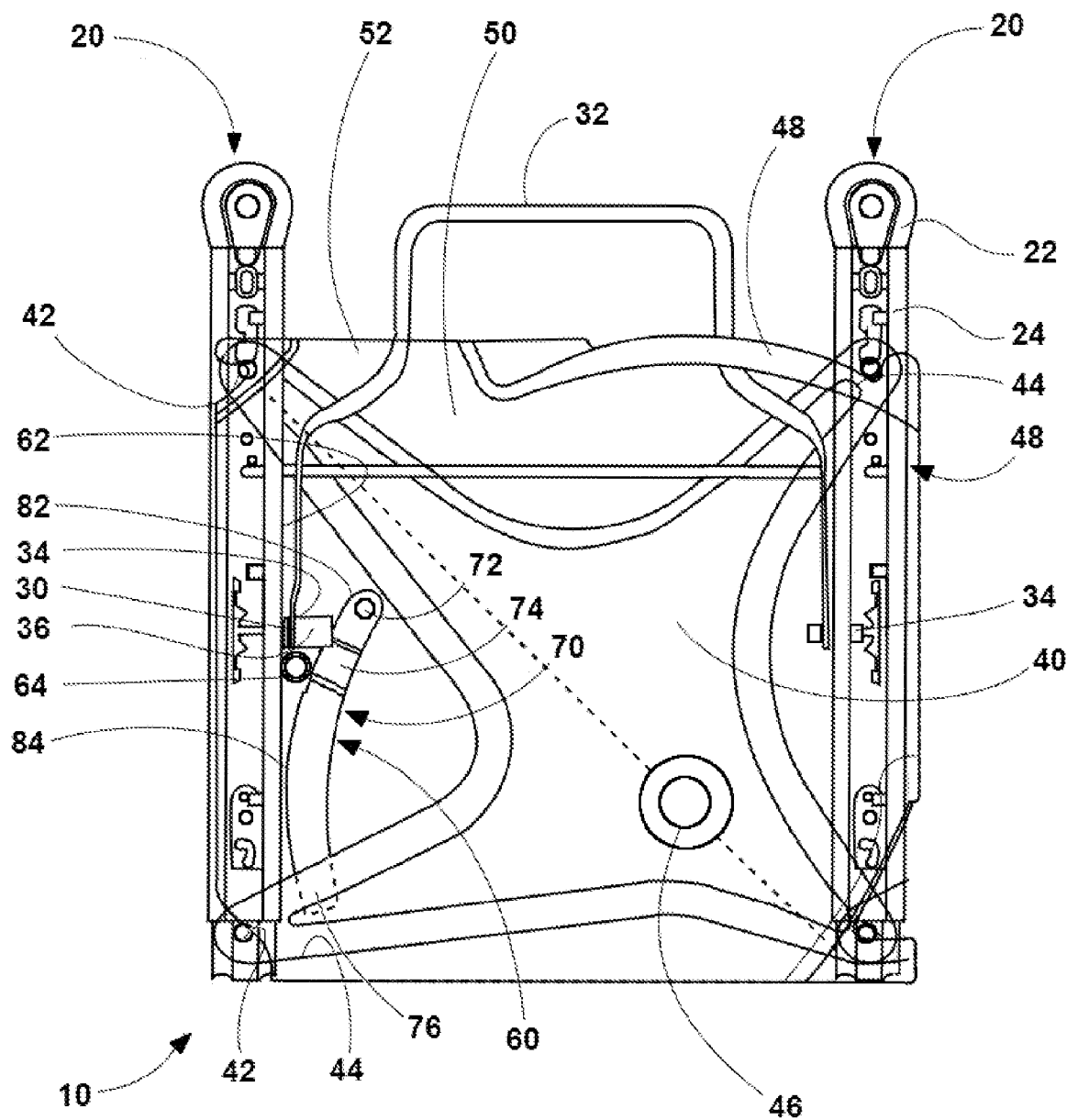
FIG. 2 is a schematic diagram of a vehicle seat base in the normal seating position.
Figure 3:
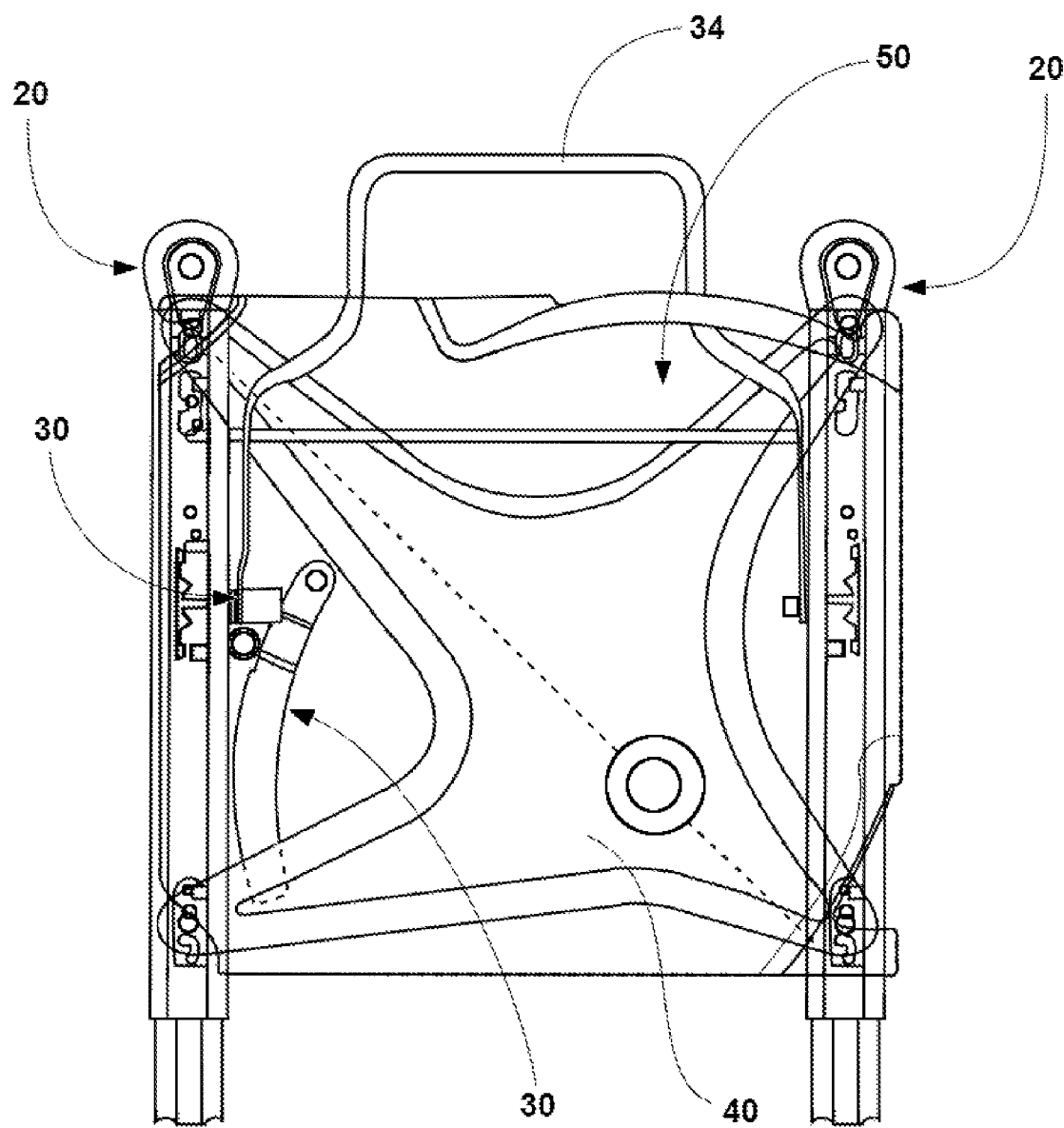
FIG. 3 is a schematic diagram of a vehicle seat base in the normal seating position as in FIG. 2 with a seat base moved forward in the vehicle tracks as compared to FIG. 2.

As illustrated in the Figures, in particular FIGS. 2-8, the present invention is directed to a seat assembly 10 generally having a track assembly 20, an intermediate member 40 coupled to the track assembly 20, a seat base 50 upon which an occupant would sit coupled to the intermediate member and a rotational mechanism 60 providing the combined forward and rotational movement of the seat assembly 10. The seat would, as illustrated in FIG. 1, have a seat back 55.

The seat assembly 10 may be formed of any style, size, shape, or configuration depending upon the desired design, aesthetic and functional characteristics needed or desired for a particular vehicle. The illustrated seat assembly 10 in the Figures is only an exemplary seat assembly, and the present invention may be applied to other vehicle seats allowing for the below described combined rotational and linear movement.

The track assembly 20 generally includes a base track 22 and seat track 24 which slide relative to each other. The track assembly 20 may be any known or desirable track assembly and in particular, any known or desirable track assembly used with manual or non-powered seats. The track assembly 20 may include a memory feature which allows the seat to be slid forward and rotated and then, when returned, wherein the seat, specifically the track assembly 20, returns to the original position. The memory position allows easy ingress and egress of people behind the seat without the need for the seat occupant to readjust the position. The base track 22 is typically secured to the floor of the vehicle or vehicle pan while the seat track 24 slides within the base track 22 and is typically coupled to the seat base 50 or as illustrated in the present invention, to the intermediate member 40. The base track 22 and seat track 24 are coupled together to provide linear movement and adjustment for the seat assembly 10. To provide for the desired linear adjustment while having the ability to lock the track assembly 20 in a particular desired position, the track assembly 20 generally includes a track latch assembly 30. The track latch assembly 30 generally includes a release bar 32 or other release mechanism for operating a latch 34. The release bar 32 may have various sizes, shapes and configurations depending upon the desired application and design characteristics, however the release bar 34 illustrated in the Figures should only be considered exemplary and not limiting to the present invention. The latch mechanism 34 is illustrated in the Figures and may also vary as desired so long as the latch mechanism 34 provides sufficient latch capabilities to lock the seat track 24 relative to the base track 22.

The track latch assembly 30 of the present invention also includes a secondary release engagement point, surface, or mechanism 36 to allow combined rotational and linear movement in addition to the only linear movement described above with the first latch mechanism 34. The second release engagement mechanism 36 may be operationally coupled to an additional latch release other than the release bar 32. Of course, the secondary release engagement mechanism 36 of the present invention in some configurations may be the release bar 32 itself so long as the secondary release engagement mechanism 36 allows for the releasing of the first latch mechanism 34 and then reengagement of the first latch mechanism 34 as described below in conjunction with the combined linear and rotational movement of the vehicle seat.

The intermediate member 40 as illustrated in the Figures may vary in size, shape, and configuration and is provided to ensure smooth linear motion along the track assembly 20 by the seat base 50 as well as work in conjunction with the seat base 50 and rotational mechanism 60 to provide the rotational movement. An intermediate member 40 is also configured to prevent racking or undesirable forces between the seat base 50 and track assembly 20 as well as along the linear movement of the seat track 24 relative to the base track 22 while the seat rotates. The intermediate member 40 illustrated in the Figures is exemplary and includes track couplings 42 which couple the intermediate member 40 to the seat track 24. The intermediate member 40 also includes a seat coupling mechanism 44 which allows the base 50 to pivot relative to the intermediate member 40, which in the illustrated Figures can be a single pivot coupling 46 or a pin slide coupling (not illustrated) located on the seat base 50 as well as the intermediate member 40. In addition, in some embodiments the seat coupling 44 may use both of a single pivot 46 combined with the pin slide couplings. The intermediate member 40 is configured to have sufficient rigidity and structure to provide the above described features. Although the intermediate member 40 is illustrated as a single member in the Figures, it can be formed from multiple members such as a pair of crossed bars or an assembled frame.

The seat base 50 upon which the vehicle occupant sits generally includes a frame 52 which is in turn coupled to the intermediate member 40. One of the frame 52 and intermediate member 40 are also coupled to the rotational mechanism 60. The seat base 50 and frame 52 may take on any desired size, shape, style, or configuration desired so long as they capable of being coupled to an intermediate member 40 as well as the rotational member 60.

The rotational mechanism 60 is configured to provide rotational movement to the seat base 50 relative to the track assembly 20 while the seat base 50 moves linearly along the track assembly 20. Therefore, in the present invention, the seat base 50 is capable of various different movements. First, the seat base 50 is capable of linear movement solely along the track assembly 20. This linear movement allows for adjustment and placement of the seat as is found in most vehicle seats without rotation. The rotational mechanism 60 is also configured to create rotational movement under certain circumstances as the seat base 50 moves linearly along the track assembly 20 thereby causing the seat base 50 to have a combined linear and rotational movement, hereafter referred to as combined movement. The rotational mechanism 60 may be any type of mechanism configured to allow or create rotational mechanism with linear movement in conjunction with rotational movement. The present invention illustrates an exemplary rotational mechanism 60 in FIGS. 2-8. The rotational mechanism 60 generally includes a track rack 62 aligned along or coupled to the base track 22 in the illustrated embodiment. Of course, the track rack 62 could be instead coupled to a floor or other stationary object.

The rotational mechanism 60 further includes an intermediate gear 64 which engages the track rack 62 and a helix gear 70 which engages the opposing side of the intermediate gear 64. The helix gear 70 is configured to have an arcuate shape that transfers the rotational movement of the seat 10 to the intermediate gear 64 thereby creating linear movement relative to the track rack 62. The helix gear 70 is configured in the illustrated embodiment to have an unengaged portion 72, a ramp engagement portion 74, and an engaged portion 76. The helix gear 70 is further configured to also have a geared portion 80 and a smooth portion 82. The geared portion 80 extends generally along the engaged portion 76 while the smooth portion 82 typically extends along the unengaged portion 72 and in some embodiments also along the ramp engagement portion 74. The smooth portion 82 may allow some rotation without the combined movement to first release the latch mechanism before the combined movement starts. In the Figures, the seat may rotate about approximately 5° freely, although other angles of free rotation may be selected. Of course, in some embodiments this free rotation may be eliminated. The configuration of the helix gear 70 illustrated in the Figures provides an exemplary mechanism to allow for easy engagement and disengagement of the track latch assembly 30 allowing the present invention to use an existing track latch assembly and thereby minimize the amount of moving parts in the vehicle seat. The placement and direction of the helix is exemplary and could be configured to provide relative motion from a variety of directions and placements.

The size, shape, and configuration of the track rack 62, intermediate gear 64, and helix gear 70 may vary as desired so long as the combined movement described above is provided for or created by the rotational mechanism 60. By varying the size of the intermediate gear 64, the present invention may vary the amount of rotation experienced or degree or amount of rotation experienced for a particular linear movement. For example, in some vehicles, it may be desired to have greater or quicker rotation of the seat base 50 experienced for the same amount of linear movement along the track assembly 20. For compact vehicles that may have limited range of linear movement along the track assembly 20, it would be desirable to add intermediate gear 64 sized to take advantage of increased rotation over a smaller linear movement than in a vehicle where substantially more linear movement is provided. The size of the intermediate gear 64 may be also configured to relate not only to the amount of linear movement available to the track assembly 20 but also the amount of linear movement available when a vehicle occupant is within the seat assembly 10. For example, if the seat is configured to be moveable with a vehicle occupant in the seat while allowing access ingress and egress to a seating row behind the occupied seating assembly 10, greater degree of rotational movement may be desired for a particular distance of linear movement than that of one that is configured for unoccupied movement. This is to minimize conflict between the seat assembly 10 or occupant and the next forward seating row as well as with any door frames with any other assemblies in providing the desired rotational and linear combined movement in the minimal amount of space. In addition, the size of the intermediate gear 64 may vary if the seating assembly is that of a front seat, providing easier access for vehicle occupants with limited range of motion. Of course, a designer or manufacturer may balance the amount of rotational movement to the amount of linear movement depending upon the desired characteristics.

The direction of rotation may vary depending on desired direction of rotation. FIG. 1 illustrates a clockwise rotation on initiation and a counterclockwise rotation on the return. It is expected that seats on one side of the vehicle may have opposite rotational configurations as compared to the other side. In addition, for some vehicles, it may provide easier ingress and egress for passengers seated in the row behind the subject seat for the front edge of the seat to rotate inwardly, while others may have the front edge configured to rotate outwardly toward the door opening as illustrated in FIG. 1. Of course, although the seat back does not need to be folded forward, in some embodiments this movement may also be combined to improve ingress and egress, such as for a front seat of a compact coupe.

The present invention also includes a secondary release mechanism (not shown) which is coupled to the rotational mechanism 60 that releases the seat base 50 for rotational and linear combined movement. The secondary release mechanism may be any type of release mechanism such as a lever on the side of the seat, a lever on the side of the seat back or any other desired location where it is easily accessible to an occupant to the seat assembly 10 as well as an individual standing outside of the vehicle. An engagement catch 90 may be seen in the Figures as preventing rotational movement until released by the secondary release mechanism. The second release mechanism may also be operationally coupled to the release bar, such that a certain amount of movement plus the first release mechanism and further movement of the release bar also disengages the rotational mechanism catch, allowing both linear and rotational movement of the seat.

Figure 4:
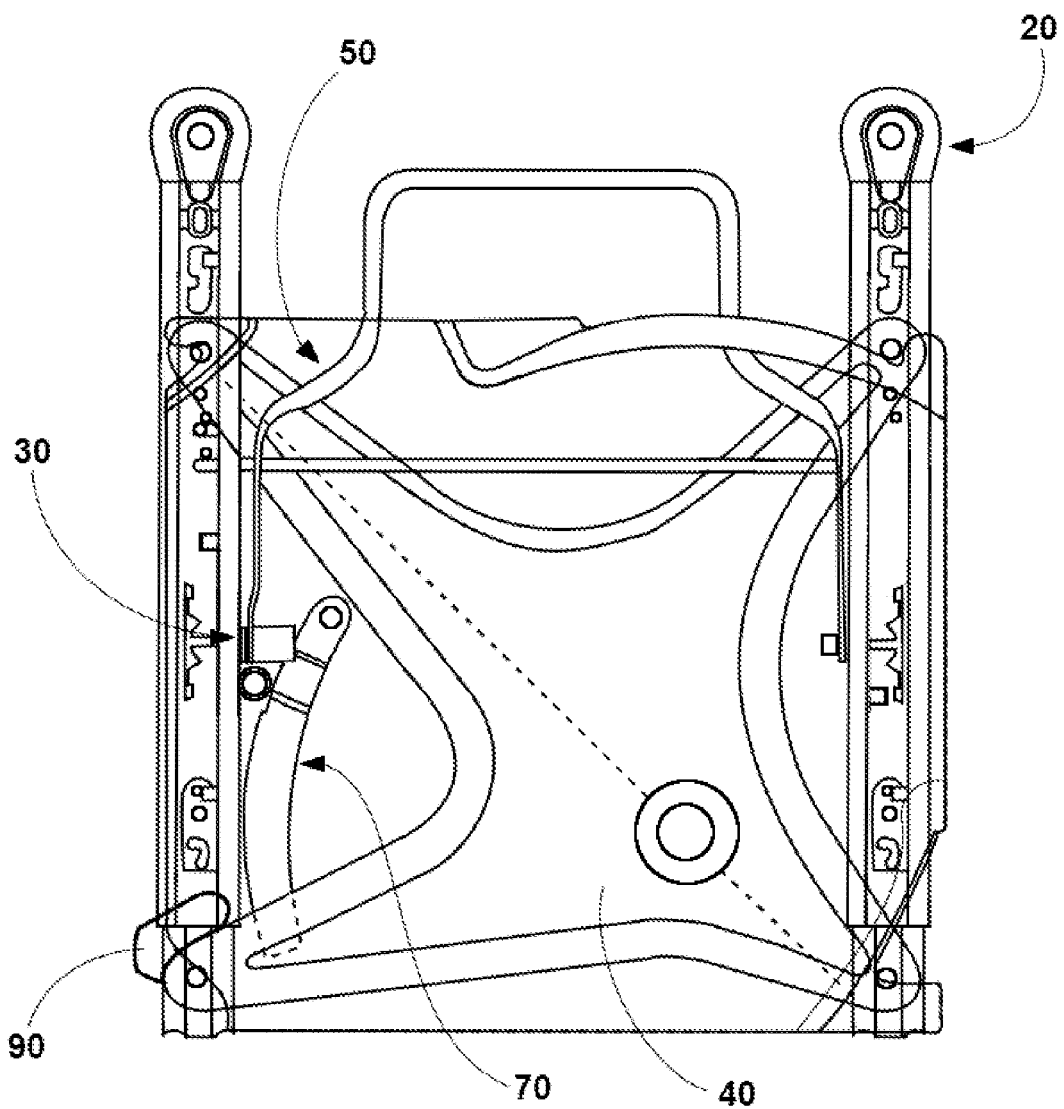
FIG. 4 is a schematic diagram of a vehicle seat in FIG. 2 in an initial position with the rotational latch disengaged to allow forward rotational movement.
Figure 5:
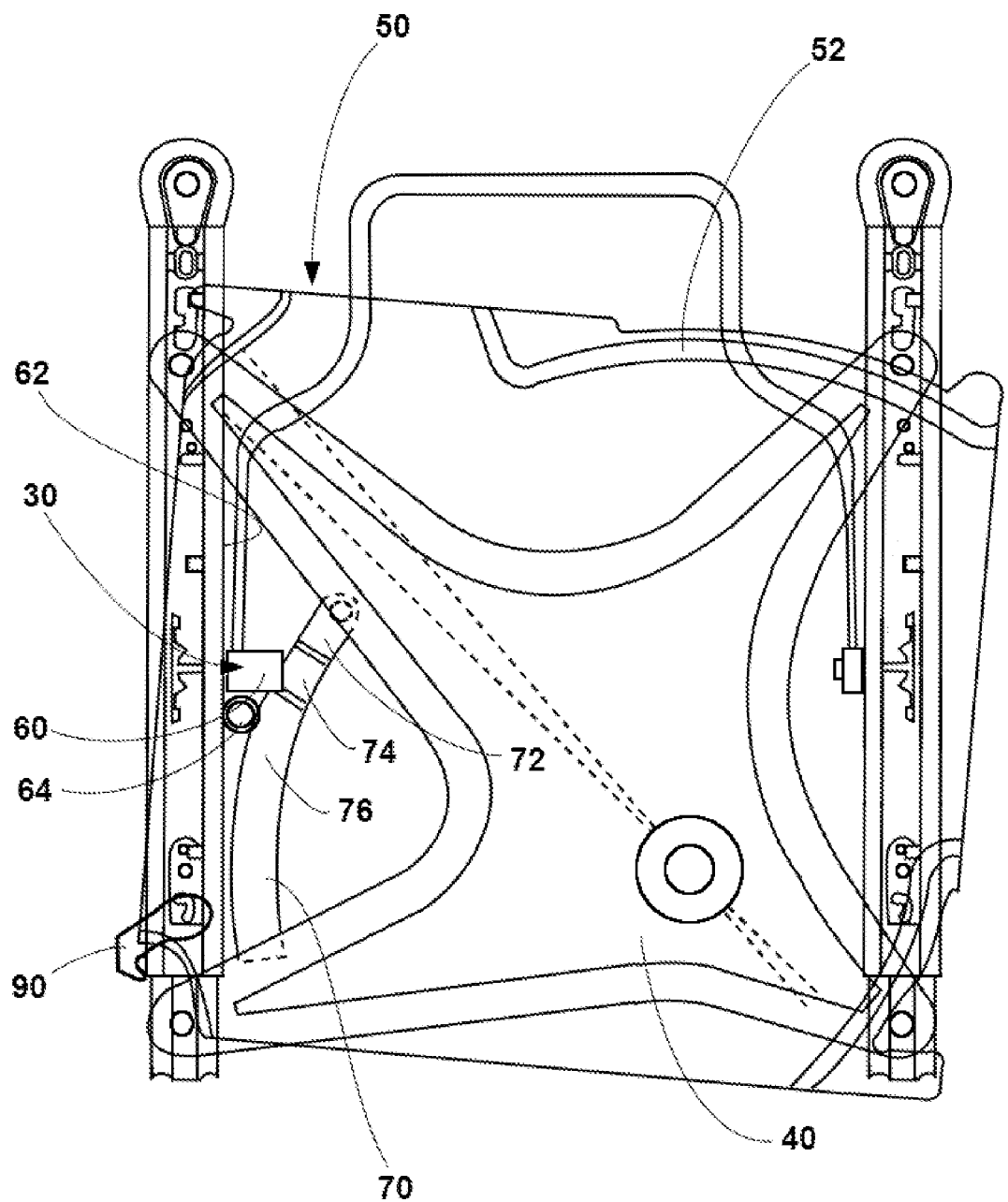
FIG. 5 is a schematic diagram of the vehicle seat in FIG. 4 in intermediate position which is moved forward and slightly rotated as compared to FIG. 4.

In operation, the seat assembly 10 is configured to provide the desired combined movement. As discussed above, if only linear movement is desired, the occupant would provide a force to the release bar 32 thereby releasing the latch 34 on the track latch assembly 30 allowing the track assembly in particular the seat track 24 to slide relative to the base track 22. The rotational mechanism may move with the seat back 24 or be fixed to move with the seat back 24 when no rotational movement is desired. If the user desires to provide rotational combined movement for easy ingress and egress of the vehicle, the secondary release mechanism which may be attached to the release bar or a separate latch, such as one easily accessible to a passenger behind the seat, would be activated by the individual thereby releasing the latch on the rotational mechanism 60 or any other type of latch system that prevents the combined movement. With the secondary release mechanism released, the seat would be positioned as illustrated in FIG. 4. As part of the secondary release mechanism (not illustrated), an engagement catch 90 engaging the intermediate member 40 is illustrated as preventing the combined movement in FIG. 4. FIG. 5 illustrates the engagement catch 90 being released from the intermediate member 40.

Figure 6:
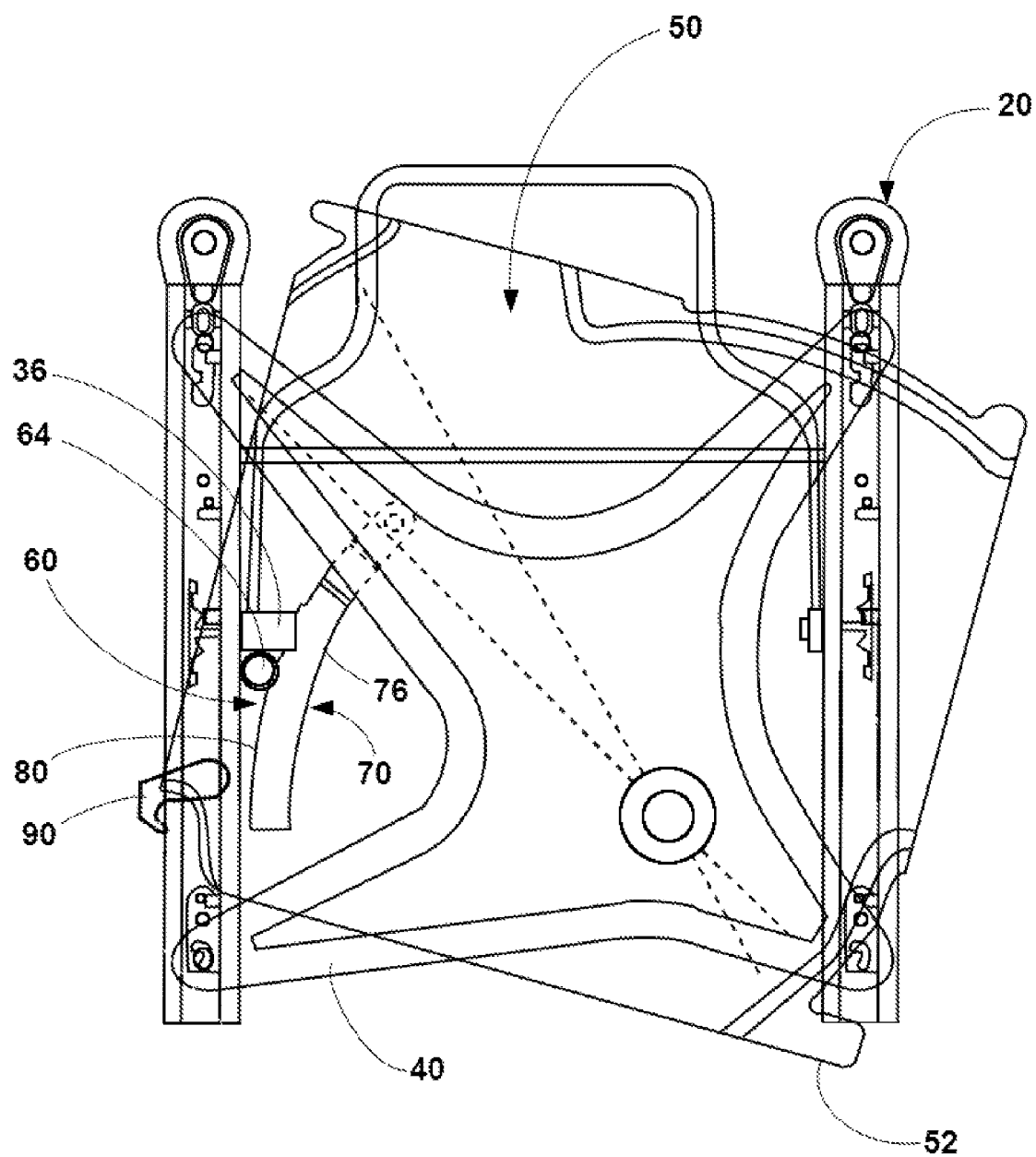
FIG. 6 is a schematic diagram of the vehicle seat in FIGS. 4 and 5 in a second intermediate position and as compared to FIG. 5 further rotated and pushed forward.

Once the release mechanism for the rotation is disengaged, the user would rotate the seat. The initial rotation of the seat as illustrated in FIG. 5 is started without disengaging the track latch assembly 30. This is due to the helix gear 70 including the unengaged portion 72 passing by the secondary release engagement 36 without engaging the secondary release engagement 36. Once the ramp engagement portion 74 engages the secondary release engagement 36 and pushes the secondary release engagement in a direction of release, the track latch assembly 30, even if the person is not pulling on the release bar, is released for linear movement. At this point, the intermediate gear 64 is also engaged with both the track rack 62 and helix gear 70 forcing any movement to be combined linear and rotational movement. As the seat base 50, in particular the frame 52 is continually rotated as illustrated in FIG. 6, the secondary release engagement is continually held in the release position by the engaged portion 76 of the helix gear 70. The helix gear 70 rotates the geared portion 80 by the intermediate gear 64 thereby having the rotational movement of the seat base 50 drive the linear movement along the track assembly 20 or the linear movement along the track assembly drive the rotational movement of the helix gear 70 and thereby the seat base 50. As the vehicle seat 10 slides further forward in a linear movement along the track assembly 20 in FIG. 7, the seat continues its rotational movement. FIG. 8 illustrates the furthest extent of rotational movement along with combined linear movement. Of course, one skilled in the art should easily recognize that the amount of combined movement may vary also upon the desired movement input by the user such that the user may stop at a certain point such as in FIG. 6 or 7 with sufficient space to allow the easy ingress or egress desired.

Figure 7:
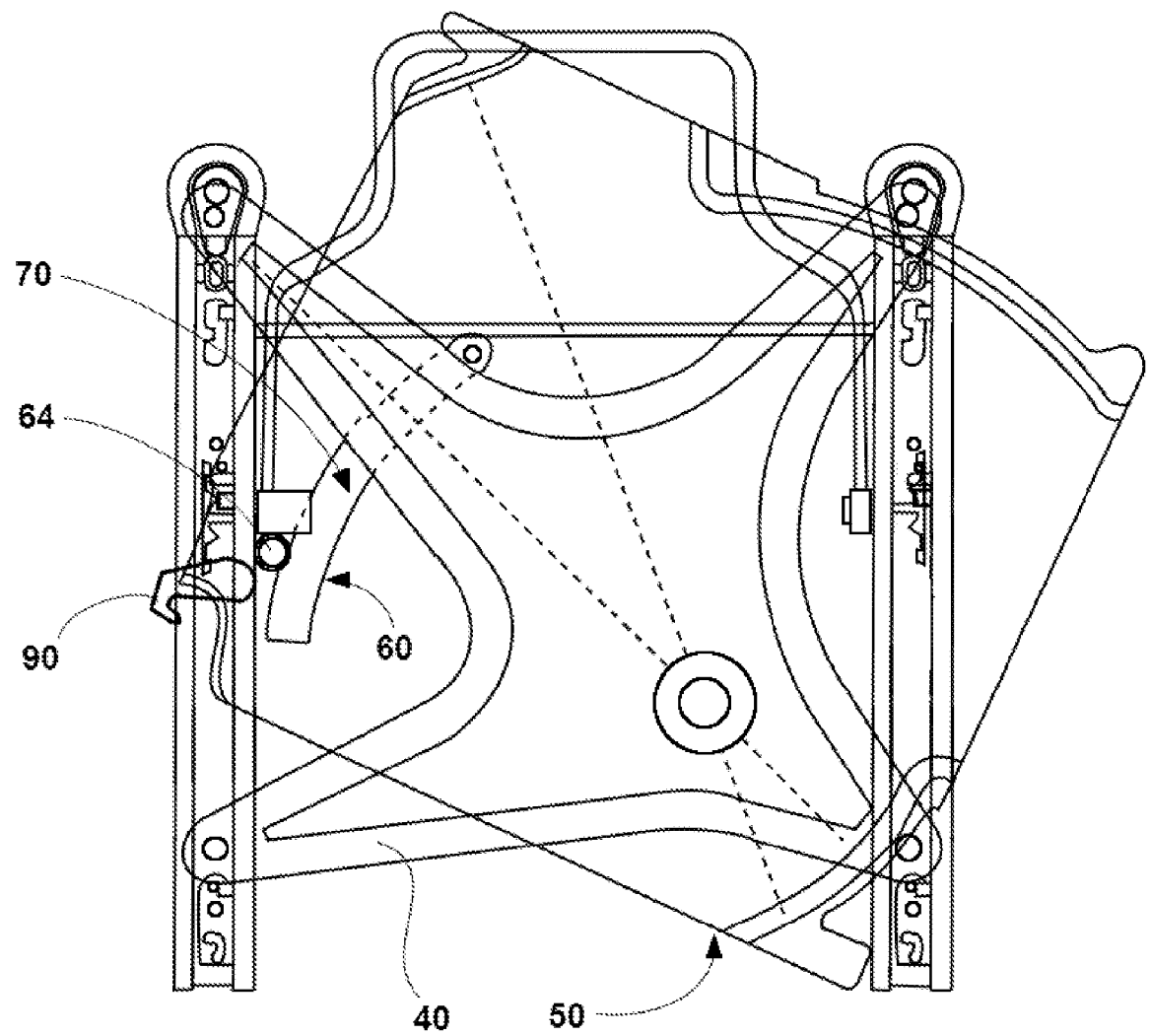
FIG. 7 is a schematic diagram of the vehicle seat in FIGS. 4-6 in a third intermediate position illustrating further rotation and forward movement than in FIG. 6.
Figure 8:
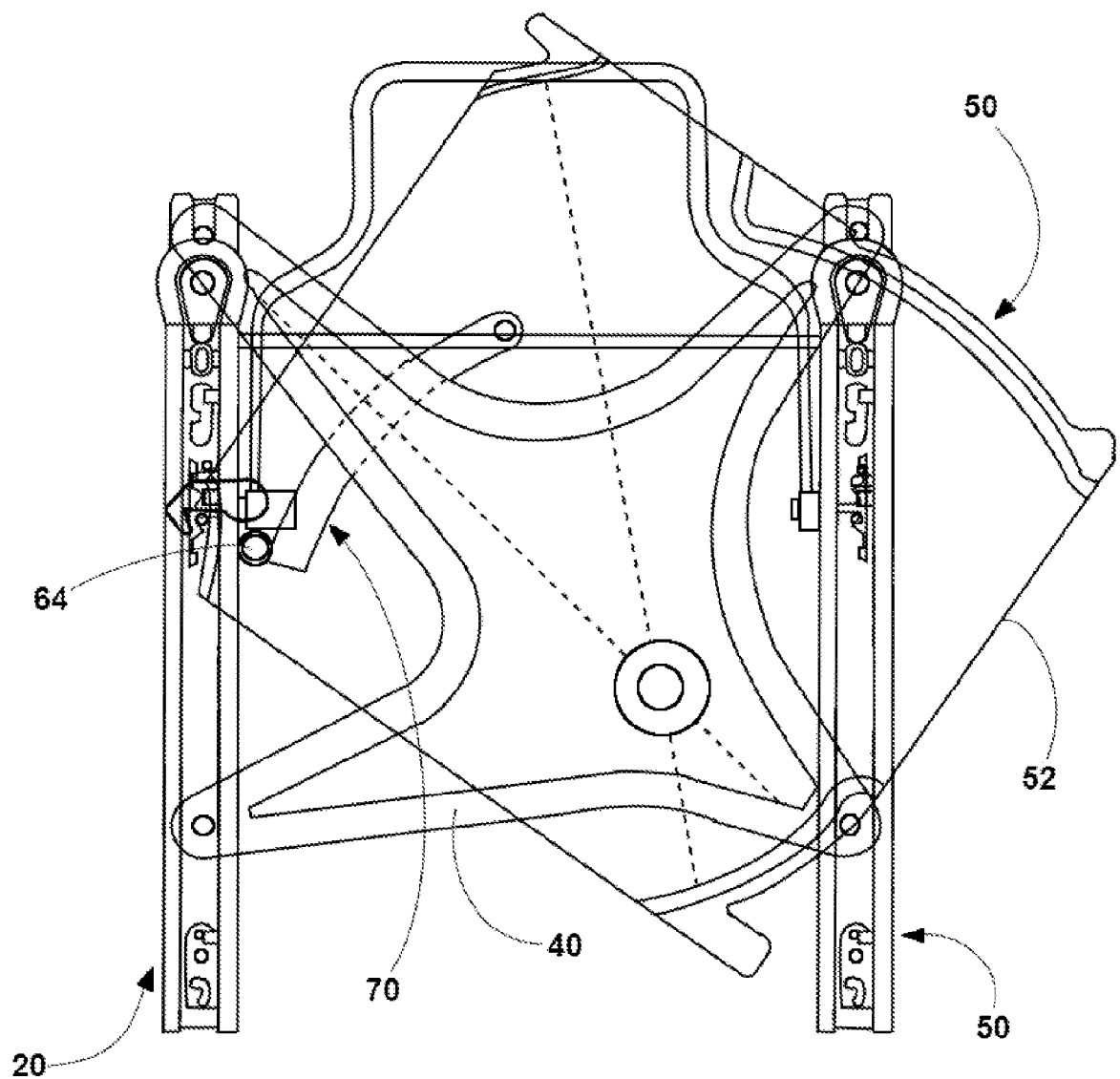
FIG. 8 is a schematic diagram of the vehicle seat in FIGS. 4-7 illustrating full rotation and forward movement of the vehicle seat to a final position thereby allowing easy ingress and egress from the vehicle.

Once the individual has determined that the proper ingress or egress has been applied and is ready to return the seat 10 to its normal seating position, the user would rotate the seat, linearly move the seat rearward in the track assembly, or provide a combined force of rotational and linear movement moving the seat in reverse order such as moving it from FIG. 8 to FIG. 7 to FIG. 6 and to FIG. 5 and finally to FIG. 4. As part of the rearward movement, the helix gear 70 would move pass the intermediate gear 64 and turn, driving or vice versa the track rack creating the combined movement. As the helix gear 70 reaches the ramp engagement portion 74, pressure applied while the engaged portion 76 engage the secondary release engagement 36 is released, thereby locking the track latch assembly 30 in the desired linear position. As discussed above, a memory features may be used causing the linear position to be equal to the location before rotational movement was initiated. When the ramp engagement portion 74 completely releases the secondary release engagement 36 such as when the helix gear 70 reaches the unengaged portion 72, the track latch assembly 30 will lock into position. It should be recognized that one benefit of the present invention is that through the use of the rotational mechanism, in particular the track rack 62, intermediate gear 64 and helix gear 70, the seat 10 may be moved with combined movement linearly forward as well as rotational movement and then returned to the exact position of linear movement, specifically the exact linear position of the seat track 24 relative to the base track 22. This allows the user or occupant of the seat assembly 10 to be in the same position as before applying the combined movement. This is beneficial such that the user is eliminated from requiring extra steps such as applying a force 32 to the release bar to adjust the linear position of the track assembly 20 after providing the combined movement for ingress and egress.

The replacement of the rotational latch and addition of a structural power actuator would create a simple power alternatively to this manual system. In addition, the system could be configured to allow only swiveling of the seat. Also, the system could be configured such that the helix releases the track but does not drive the track to allow more variations in positions selected by the occupant.

Conversely if one were to have high travelling tracks with a forward dwell beyond the seating range, the rotational latch could likewise be disengaged within this extended travel zone and be meshed with the linear rack thereby creating a rotational movement at the end of track travel. Hereby creating an increased entry/exit zone. An alternative of said design would be to replace rotational latch with a nested zone for frame 50 where rotation is not feasible in the adjustable seated region of track travel. Additional benefit of said design is it would put seat in forward region thereby making swing of seatback feasible on seats other than dual captain chair application.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A seat assembly for a vehicle comprising:
a track assembly capable of providing linear movement;
a first latch assembly coupled to said track assembly and having a first release mechanism and wherein said first latch assembly is configured to selectively allow or prevent linear movement of said track assembly;
a second release mechanism configured to selectively allow rotational movement and linear movement of the seat assembly;
a seat base;
an intermediate member coupled to each of said seat base and said track assembly and wherein said track assembly is not directly coupled to said seat base; and
a coupling mechanism coupling said seat base to said intermediate member and wherein said coupling mechanism is configured to allow said seat base to rotate relative to said track assembly.

2. The seat assembly of claim 1 wherein said coupling mechanism is selected from one of a single pivot and pin slide couplings.

3. The seat assembly of claim 1 further including a rotational mechanism and wherein said rotational mechanism is configured to provide rotational movement to the seat base relative to the track assembly while said seat base moves linearly along said track assembly.

4. The seat assembly of claim 3 wherein said rotational mechanism further includes a rack coupled to the track, a helix gear coupled to one of the intermediate member and seat base and an intermediate gear disposed between said rack and said helix gear.

5. The seat assembly of claim 4 wherein said helix gear has an arcuate shape configured to translate linear motion of the track rack into rotational motion of the seat base.

6. The seat assembly of claim 4 wherein said helix gear includes a geared portion including gear teeth and a smooth portion free from gear teeth.

7. The seat assembly of claim 6 wherein said smooth portion forms approximately equal to or less than 5 degrees of rotation.

8. The seat assembly of claim 4 wherein said helix gear is configured to move linearly with said intermediate member.

9. The seat assembly of claim 1 wherein said track assembly further includes a first track coupled to a rack, a second track coupled to said intermediate member and wherein said first and second tracks move relative to each other to provide said linear movement.

10. The seat assembly of claim 9 further including an intermediate gear coupled to said second track and engaging said rack.

11. The seat assembly of claim 10 further including a helix coupled to said intermediate member and engaging said intermediate gear and wherein said helix has an arcuate shape including an edge having a smooth portion and a geared portion.

12. The seat assembly of claim 11 wherein said intermediate gear remains engaged with said rack as said track assembly experiences linear movement but does not engage the helix and is proximate to said smooth portion when said seat assembly is in a normal position.

13. A seat assembly for a vehicle comprising:
a track assembly capable of providing linear movement;
a first latch assembly coupled to said track assembly and having a first release mechanism and wherein said first latch assembly is configured to selectively allow or prevent linear movement of said track assembly;
a second release mechanism configured to selectively allow rotational movement and linear movement of the seat assembly;
a seat base,
an intermediate member coupled to each of said seat base and said track assembly and wherein said track assembly is not directly coupled to said seat base;
a rotational mechanism including a rack coupled to the track assembly, a helix gear, and an intermediate gear, and wherein said rotational mechanism is configured to provide rotational movement to the seat base relative to the track assembly while said seat base moves linearly along said track assembly, and wherein the helix gear is coupled to one of the intermediate member and seat base and the intermediate gear is disposed between said rack and said helix gear, and wherein said helix gear includes a geared portion including gear teeth and a smooth portion free from gear teeth forming approximately equal to or less than 5 degrees of rotation, and wherein said helix gear further includes a ramp engagement portion approximately between said geared portion and said smooth portion; and a coupling mechanism coupling said seat base to said intermediate member and wherein said coupling mechanism is configured to allow said seat base to rotate relative to said track assembly.

14. The seat assembly of claim 13 wherein said ramp engagement portion engages a secondary release engagement coupled to said first latch assembly to selectively allow linear movement of said track assembly.

15. The seat assembly of claim 14 wherein said intermediate gear is configured to engage said gear teeth on said helix gear before said secondary release engagement allows linear movement of said track assembly.

16. A seat assembly for a vehicle comprising:
   a track assembly capable of providing linear movement and wherein said track assembly further includes a first track and a second track and wherein said first and second tracks move relative to each other to provide said linear movement;
   a first latch assembly coupled to said track assembly and having a first release mechanism and wherein said first latch assembly is configured to selectively allow or prevent linear movement of said track assembly;
   a second release mechanism configured to selectively allow rotational movement and linear movement of the seat assembly;
   a seat base;
   an intermediate member coupled to each of said seat base and said second track of said track assembly and wherein said track assembly is not directly coupled to said seat base;
   an intermediate gear coupled to said second track and engaging a rack coupled to said first track;
   a helix coupled to said intermediate member and engaging said intermediate gear and wherein said helix has an arcuate shape including an edge having a smooth portion and a geared portion, and wherein said intermediate gear remains engaged with said rack as said track assembly experiences linear movement but does not engage the helix and is proximate to said smooth portion when said seat assembly is in a normal position, wherein said intermediate member only engages the geared portion of said helix upon releasing of a second latch assembly coupled to said second release mechanism; and
   a coupling mechanism coupling said seat base to said intermediate member and wherein said coupling mechanism is configured to allow said seat base to rotate relative to said track assembly.

17. The seat assembly of claim 16 further including a latch configured to engage and prevent movement of one of said intermediate gear and said helix gear and wherein said latch is operationally coupled to said second release mechanism.

* * * * *